US 9,148,485 B2

(12) United States Patent
Mannava et al.

(10) Patent No.: US 9,148,485 B2
(45) Date of Patent: ***Sep. 29, 2015

(54) REDUCING PACKET SIZE IN A COMMUNICATION PROTOCOL

(71) Applicant: Intel Corporation, Santa Clara, CA (US)

(72) Inventors: Phanindra K. Mannava, Folsom, CA (US); Hari K. Nagpal, Framingham, MA (US); Meenakshisundaram R. Chinthamani, Hillsboro, OR (US); Robert J. Safranek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 13/709,632

(22) Filed: Dec. 10, 2012

(65) Prior Publication Data

US 2013/0103783 A1 Apr. 25, 2013

Related U.S. Application Data

(63) Continuation of application No. 12/748,644, filed on Mar. 29, 2010, now Pat. No. 8,473,567.

(51) Int. Cl.
*G06F 15/173* (2006.01)
*G06F 15/16* (2006.01)
*H04L 29/08* (2006.01)
*H04L 29/06* (2006.01)

(52) U.S. Cl.
CPC .......... *H04L 67/2842* (2013.01); *H04L 65/607* (2013.01)

(58) Field of Classification Search
CPC ........................... H04l 67/2842; H04l 65/607
USPC ........ 709/216–233; 710/11; 713/151; 726/15
See application file for complete search history.

(56) References Cited

U.S. PATENT DOCUMENTS

| 6,009,488 | A | 12/1999 | Kavipurapu | |
|---|---|---|---|---|
| 7,590,805 | B2* | 9/2009 | Sistla et al. | 711/146 |
| 7,797,503 | B2* | 9/2010 | Bellofatto et al. | 711/163 |
| 7,822,921 | B2* | 10/2010 | Taylor | 711/114 |
| 8,169,850 | B2* | 5/2012 | Sistla et al. | 365/233.1 |
| 2004/0117566 | A1* | 6/2004 | McClannahan et al. | 711/154 |
| 2006/0221831 | A1* | 10/2006 | Wadekar et al. | 370/235 |

(Continued)

OTHER PUBLICATIONS

An Introduction to the Intel QuickPath Interconnect, Jan. 2009, pp. 1-22.*

(Continued)

*Primary Examiner* — Haresh N Patel
(74) *Attorney, Agent, or Firm* — Trop, Pruner & Hu, P.C.

(57) ABSTRACT

In one embodiment, the present invention includes a processor that can generate data packets for transmission to an agent, where the processor can generate a data packet having a command portion including a first operation code to encode a transaction type for the data packet and a second operation code to encode a processor-specific operation. This second operation code can encode many different features such as an indication that the data packet is of a smaller size than a standard packet, in order to reduce bandwidth. This operation code can also identify an operation to be performed by a destination agent coupled to the agent. Other embodiments are described and claimed.

16 Claims, 9 Drawing Sheets

150

| L17 | L16 | L15 | L14 | L13 | L12 | L11 | L10 | L9 | L8 | L7 | L6 | L5 | L4 | L3 | L2 | L1 | L0 | C1 | C0 |
|---|---|---|---|---|---|---|---|---|---|---|---|---|---|---|---|---|---|---|---|
| DNID[2:0] | | | DNID[4:3] | | Mess, Class[3:0] | | | | Opcode[3:0] | | | | Virt. Ntwk | | VoCrd[2:0] | | | | |
| RHNID[2:0] | | | RHNID[4:3] | | Address[11:6] | | | | | | | | RTID[5:0] | | | | Ack | CRC[7:0] | |
| IIB | Viral | | | | Address[27:12] | | | | | | | | | | | | | | |
| Addr[42:41] | | Address[45:43] | | | | | | | Address[40:28] | | | | | | | | | | |
| DNID[9:5] | | | | | OEM Defined [2:0] | | Addr[0] | | Rsvd | | | | Address[50:46] | | | | | | |
| RHNID[9:5] | | | | | Priv[1:0] | | | CoreID[5:0] | | | | | ThreadID[4:0] | | | | | CRC[7:0] | |
| 0b0 IIB | Poison | HPCOP[2:0] | | | | | | Address[63:51] | | | | | | | | | | | |
| RSVD | | CRT[2:0] | | Address[5:3] | | Address[2:1] | | | Byte Enable [7:0] | | | | | | | | | | |
| RSVD | | Data Byte 1 | | | | | | | Data Enable 0 | | | | | | | | | | |
| RSVD | | Data Byte 3 | | | | | | | Data Enable 2 | | | | | | | | | CRC[7:0] | |
| 0b0 IIB | Poison | Data Byte 5 | | | | | | | Data Enable 4 | | | | | | | | | | |
| RSVD | | Data Byte 7 | | | | | | | Data Enable 6 | | | | | | | | | | |

(56) References Cited

U.S. PATENT DOCUMENTS

| | | |
|---|---|---|
| 2008/0080491 A1 | 4/2008 | Saripalli |
| 2008/0120487 A1 | 5/2008 | Saripalli |
| 2009/0006800 A1* | 1/2009 | Bellofatto et al. ............ 711/170 |
| 2009/0037614 A1 | 2/2009 | Saripalli |
| 2009/0037624 A1* | 2/2009 | Saripalli ......................... 710/72 |
| 2009/0089475 A1* | 4/2009 | Chitlur et al. ................. 710/305 |
| 2009/0113140 A1* | 4/2009 | Quach ........................... 711/146 |
| 2009/0161547 A1* | 6/2009 | Riddle et al. .................. 370/236 |
| 2010/0274975 A1* | 10/2010 | Sistla et al. ................... 711/146 |
| 2010/0318626 A1 | 12/2010 | Abts et al. |
| 2011/0145510 A1 | 6/2011 | Woffinden |
| 2011/0145511 A1* | 6/2011 | Woffinden .................... 711/141 |
| 2011/0145546 A1* | 6/2011 | Woffinden ...................... 712/30 |
| 2011/0153952 A1* | 6/2011 | Dixon et al. .................. 711/135 |

OTHER PUBLICATIONS

U.S. Appl. No. 12/756,315, filed on Apr. 8, 2010, entitled, "Handling Atomic Operations For A Non-Coherent Device," by Ramakrishna Saripalli.

Darren Abramson, et al., "Intel Virtualization Technology for Directed I/O," Aug. 10, 2006, pp. 178-193.

PCI-SIG Engineering Change Notice, "Atomic Operations," Jan. 15, 2008, pp. 1-26.

Japanese Patent Office, Office Action Mailed Mar. 6, 2012 in Japanese application No. 2011-070696.

The State Intellectual Proper Office of The People's Republic of China, Office Action mailed May 10, 2013 in Chinese application No. 201110115952.4.

* cited by examiner

| L17 | L16 | L15 | L14 | L13 | L12 | L11 | L10 | L9 | L8 | L7 | L6 | L5 | L4 | L3 | L2 | L1 | L0 | C1 | C0 |
|---|---|---|---|---|---|---|---|---|---|---|---|---|---|---|---|---|---|---|---|
| | DNID[2:0] | | DNID[4:3] | | Mess. Class[3:0] | | | | Opcode[3:0] | | | | Virt. Ntwk | | | VoCrd[2:0] | | | |
| | RHNID[2:0] | | RHNID[4:3] | | | Address[11:6] | | | | | | | | RTID[5:0] | | | Ack | CRC[7:0] | |
| IIB | Viral | | | | | | | Address[27:12] | | | | | | | | | | | |
| | Addr[42:41] | | Address[45:43] | | | | | | | Address[40:28] | | | | | | | | | |
| | DNID[9:5] | | | | OEM Defined [2:0] | | Addr[0] | | | | Rsvd | | | | Address[50:46] | | | | |
| | RHNID[9:5] | | | | Priv[1:0] | | | | CoreID[5:0] | | | | | ThreadID[4:0] | | | | | |
| 0b0 IIB | Poison | | HPCOP[2:0] | | | | | | | Address[63:51] | | | | | | | | CRC[7:0] | |
| | RSVD | | CRT[2:0] | | | Address[5:3] | | | | Address[2:1] | | | Byte Enable [7:0] | | | | | | |
| | RSVD | | | | Data Byte 1 | | | | | | | | Data Enable 0 | | | | | | |
| | RSVD | | | | Data Byte 3 | | | | | | | | Data Enable 2 | | | | | | |
| 0b0 IIB | Poison | | | | Data Byte 5 | | | | | | | | Data Enable 4 | | | | | CRC[7:0] | |
| | RSVD | | | | Data Byte 7 | | | | | | | | Data Enable 6 | | | | | | |

REDUCING PACKET SIZE IN A COMMUNICATION PROTOCOL

This application is a continuation of U.S. patent application Ser. No. 12/748,644, now U.S. Pat. No. 8,473,567, filed Mar. 29, 2010, the content of which is hereby incorporated by reference.

BACKGROUND

Modern computer systems are realized by the interconnection of various components including processors, memory devices, peripheral devices and so forth. To enable communication between these different components, various links may be present to interconnect one or more of the devices together. Systems can include many different types of interconnects or links. Typically, there is a given communication protocol for each particular type of link, and communications occurring on such link are according to this protocol.

In general, a communication protocol provides for a relatively standard manner of communicating information, e.g., by way of data packets that are formed in one agent for communication to another agent. Typical data packets include a so-called header portion that may include command and other control information and a payload portion that includes data associated with the packet. Typical communication protocols for point-to-point communication in shared memory multiprocessor systems provide for a fixed data packet size. However, such fixed data packet size can unnecessarily consume interconnect bandwidth. Assume for example that a communication protocol dictates that a data packet size is a cache line size. The most common of cache line sizes in use are either 64 bytes or 128 bytes. However, if an agent seeks to send a lesser amount of bytes, e.g., 8 bytes, the full 64 or 128 byte data packet size is still transmitted, thus needlessly consuming bandwidth.

DETAILED DESCRIPTION

In various embodiments, techniques are provided to enable communication of data transactions that include data portions less than a standard data packet size for a given communication protocol. In this way, the interconnect overhead of sending a transaction that requires less than the full amount of data payload dictated by a communication protocol can be avoided. Still further, processing resources can be more fully used, as the processing complexity needed to handle a small amount of data present in a larger packet size can be avoided. That is, in conventional systems, a larger data packet can be stuffed with don't cares or a transaction may require a full data packet with byte enables. In these cases considerable link bandwidth is wasted, which further underutilizes processor compute capabilities.

While the scope of the present invention is not limited in this regard, embodiments may be used in connection with a coherent communication protocol such as a serial-based point-to-point (PtP) communication protocol. One such example is the Intel™ Quick Path Interconnect (QPI) communication protocol; of course, embodiments may be equally used with other interconnect technologies.

In general, a communication protocol may be optimized for desktop and server platforms and accordingly may implement a fixed data packet size for common workloads on such platforms. For example, a communication protocol in accordance with an embodiment of the present invention may dictate a standard data packet size to communicate 64 byte data portions. This 64 byte data portion may be segmented into a plurality of individual flow control units, referred to as flits. In addition, a data packet may further include a header portion including some number of command flits.

While such data packets may be suitable for many applications on desktop and server platforms, for some applications on such platforms and for different types of platforms such as high performance computing (HPC) platforms, this packet format can be very inefficient in transferring smaller (e.g., 8-byte) data packets. As examples, HPC-specific operations of a limited data payload size include loads, prefetches from remote nodes, and stores and atomic memory operation at remote nodes. Embodiments may provide flexibility in the size of the data payloads for a packet that is transmitted along an interconnect such that more efficient data communication can occur. The request for smaller data sizes from remote nodes will become more prevalent as usage of partitioned global address space (PGAS) programming paradigm gains greater following in the HPC community as expected.

Embodiments may enable further improvements in communication efficiency by providing for a data transfer via a so-called atomic memory operation (AMO). An AMO involves transfer from one agent to another (typically of a remote node) of a data operand along with an operation that is to be performed on this operand, and a reference to another data operand, which can be obtained by the second agent, e.g., via a memory read to a memory associated with the second agent. In some embodiments, the data operand sent with the AMO may be of smaller size than the conventional data payload size for the communication protocol (e.g., an 8 byte data operand sent along an interconnect according to a protocol that calls for 64 byte payloads).

To enable transactions to occur with transmission of data packets having payloads less than a standard payload size for a given communication protocol, various fields may be included in command portions of a packet that enable a packet format having a payload portion less than the standard payload size. As will be discussed below, in one embodiment extensions to existing request types can be provided to enable these smaller data packets.

Figure 1:
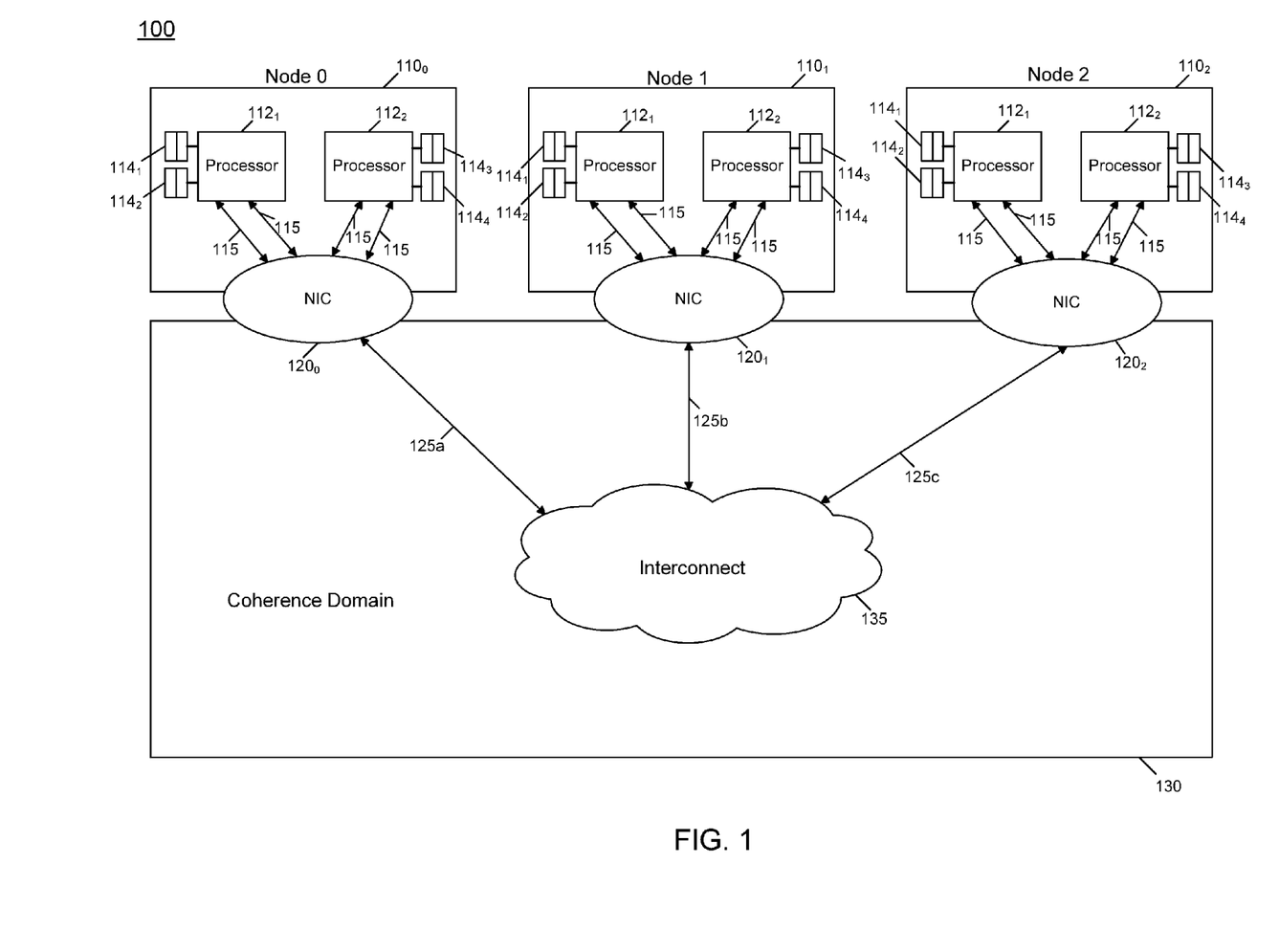
FIG. 1 is a block diagram of a platform in accordance with an embodiment of the present invention.

Embodiments may be used in connection with many different types of systems. However, particular implementations may be for an HPC-type platform where many nodes (e.g., thousands of nodes) may be interconnected to provide computing capability for HPC applications. Referring now to FIG. 1, shown is a block diagram of an HPC platform in accordance with an embodiment of the present invention. As shown in FIG. 1, system 100 may be an HPC platform that includes a plurality of nodes $110_0$-$110_2$. Although shown with only three nodes for illustration, understand that in that many implementations many hundreds or thousands of nodes may be present. As seen, each node may include various processing capabilities, including a plurality of processors. Specifically, each node includes two processor sockets $112_1$-$112_2$. Each processor socket may be coupled to one or more portions of a local memory which in one embodiment may be dynamic random access memory. Specifically, processors 112 may be coupled to local memories $114_1$-$114_4$. In the implementation of FIG. 1, multiple PtP links 115 may be provided between each processor and a node controller or network interface controller (NIC) 120. Communications on such links 115 may be via a PtP communication protocol, and may be within a coherent domain of this communication protocol.

To enable communications with other nodes (not shown in FIG. 1), a coherence domain 130 (e.g., of an original equipment manufacturer (OEM)) may be provided and communications with each NIC 120 may occur by way of an interconnect 125. These interconnects may in turn couple to an interconnect or fabric 135, such as the fabric of a given OEM.

Figure 2:
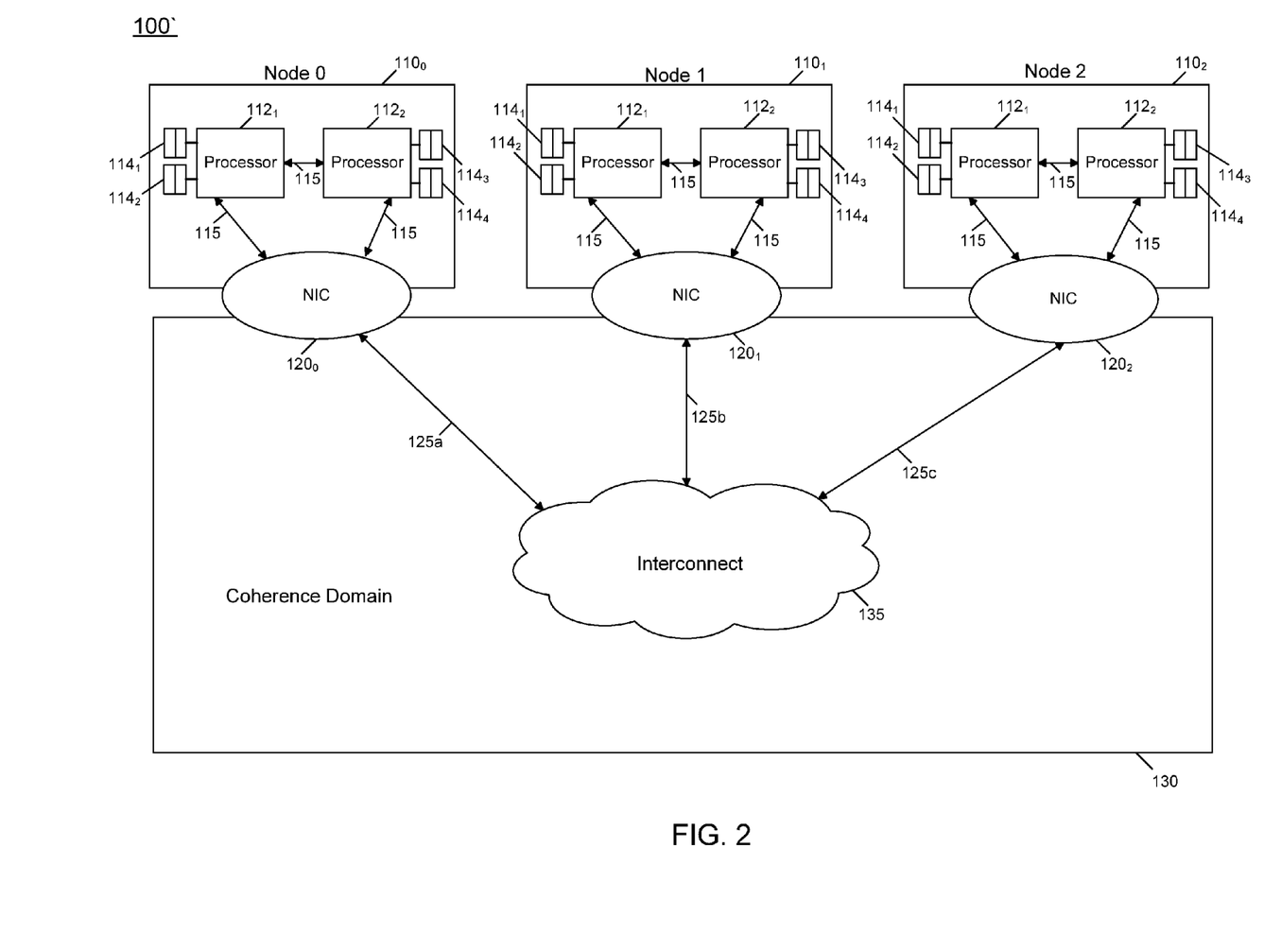
FIG. 2 is a block diagram of a platform in accordance with another embodiment of the present invention.

FIG. 2 shows a similar multi-node HPC platform. However in the implementation of FIG. 2, system 100' includes PtP interconnects 115 that may directly couple processor sockets within a node. In other respects, system 100' may be configured similarly to that discussed above regarding FIG. 1.

Embodiments may provide for optimal utilization of the PtP protocol used in the PtP links within the nodes of an HPC or other platform. Specifically, data transfer transactions (read or write) of very small data words (e.g., 8 bytes) between remote computing nodes can be performed while maximizing the bandwidth utilization on the links connecting processors or other agents to the NIC.

While the scope of the present invention is not limited in this regard, remote memory operations that may be implemented using a reduced data payload size include partial memory reads and writes, and an AMO. In one embodiment, a non-coherent partial read command (NcRdPt1) semantics can be used to initiate a read transaction, and may result in receipt of an (e.g.,) 8 byte data return packet, referred to herein as DataNc8. In one embodiment, a partial memory write can be implemented using a write combining partial write command (WcWrPt1) semantics having fields to indicate the reduced data payload.

In one embodiment, an AMO can be used to forward an (e.g.,) 8 byte operand along with a requested operation to a remote agent, which may read the second operand from a memory (e.g., associated with the remote agent). In one such embodiment, a memory controller associated with the memory may perform the requested operation using the two data operands and directly write back the result to the memory. In one embodiment, a non-coherent input/output write command (NcIOWr) semantics can be used for this operation.

To enable these operations, fields in header portions of certain packets can be used to expand the addressing capability to distributed memory at, e.g., 10's of thousands of nodes, and to manage individual thread communication more efficiently.

Figure 3:
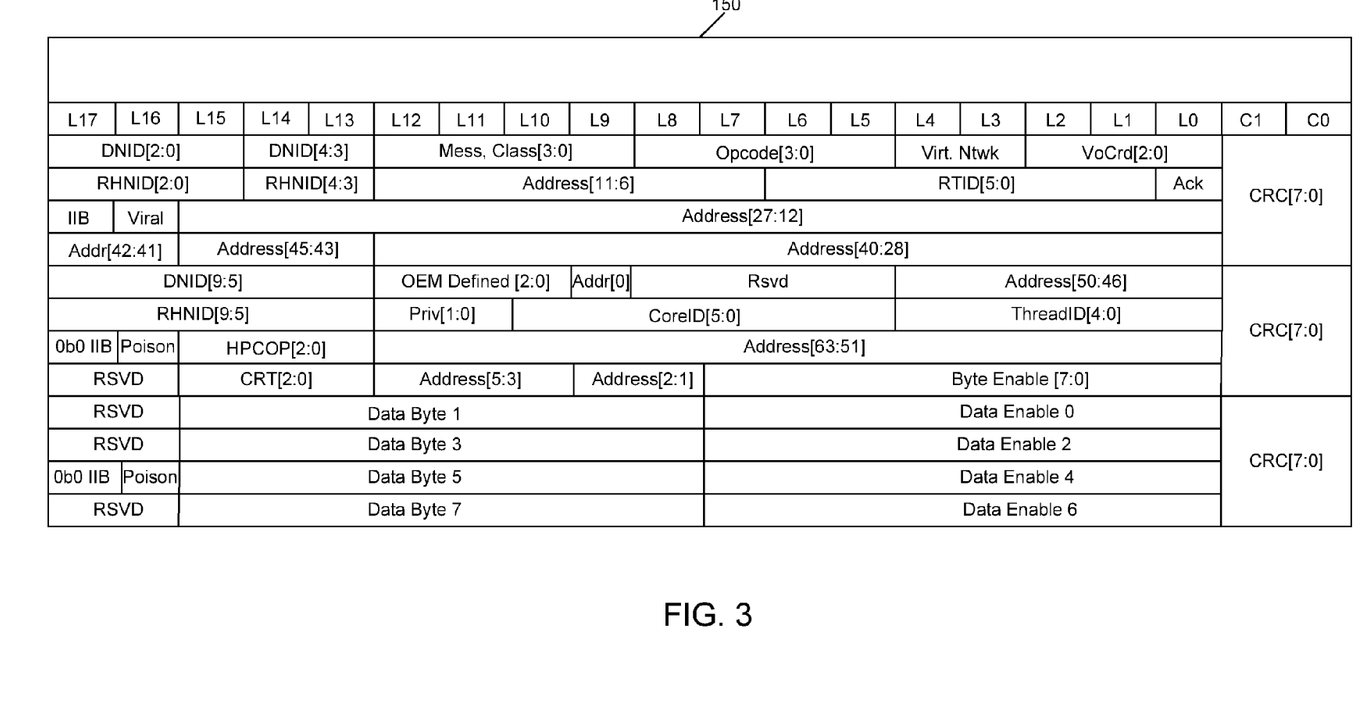
FIG. 3 is an example packet format in accordance with an embodiment of the present invention.

Referring now to FIG. 3, shown is an example data packet in accordance with an embodiment of the present invention. As seen in FIG. 3, data packet 150 includes a command header and a data portion, which may be a minimal sized data packet in accordance with an embodiment of the present invention and may include various fields to indicate different information relevant to a transaction. As to the format of the command header, shown is a set of lanes, each of which may be communicated on an individual differential pair of serial interconnects between two agents. In the embodiment shown in FIG. 3, 18 lanes of data information are provided, in addition to two checksum lanes to provide checksum information, e.g., a cyclic redundancy checksum (CRC). As seen further in FIG. 3, the command header may be two flits, with each flit formed of multiple 20-bit portions referred to as phits or physical layer units.

As seen, various information is present to provide details regarding a transaction. Nonetheless, only certain of the fields are discussed in detail below. Such information stored in the different fields may include information regarding addressing, transaction encoding (by way of an operation code, also referred to as an opcode), virtual channel information and so forth. In addition, embodiments may include a second or additional operation code field to provide information regarding a specific command to be performed, e.g., for an operation to be performed with a smaller data payload than a standard payload of a given communication protocol. In one embodiment, this field may be a 3 bit field to specify a processor-specific operation to be performed by a receiving agent (e.g., a NIC that receives a request from a processor or an actual destination of the packet). In addition, yet another operation code field may be provided to include information regarding a specific OEM command (e.g., usable to send a command from a NIC to a processor or other agent). In one embodiment, this OEM-defined command field may be a 3-bit field set by an OEM device such as a NIC to specify a command to the processor. In one embodiment, this field may be set to a value of zero for messages sent from a processor or other agent to the NIC or other OEM device. Thus FIG. 3 shows two sets of opcodes, namely a regular opcode[3:0] that is used to denote various QPI-command types and an HPC-opcode[3:0] that is used to distinguish between GSA-stores, GSA-prefetches and AMOs. All the three operations may use the same command of the regular opcode, but different HPC-opcode fields are used to distinguish between GSA-stores, GSA-prefetches and AMOs.

Still further, extended addressing information (e.g., address bits 63:51) may be present within the command header to enable addressing of a very large number of interconnected nodes, as discussed above. Embodiments may further include fields for various information to enable better thread-level management. Such thread-based fields may include a core identifier (e.g., 6 bits) to specify an identifier (ID) of a processor core that issues a request. In one embodiment, this field information may be used by a receiving agent (such as a NIC) to track the source of a request. Another such field may include a thread identifier (e.g., 5 bits) to specify an ID of a thread running on the processor core that issued the request. Again this field may be used by the NIC or other receiving agent to track the source of the request. Still further, a privilege level (e.g., 2 bits) may provide an indication of the privilege level of the thread running on the core.

In some embodiments, a different command header format may include, instead of a length field such as shown in FIG. 3, a byte enable field to indicate which of a plurality of bytes of a data portion are to be enabled. Still further, other data packet formats may have a command header that is a single flit along with a single flit data portion (e.g., formed of 8 bytes or less). Such a data packet can be used as a response or return message to provide data responsive to a read request for a limited data amount (e.g., 8 bytes or less).

Table 1 below shows example encodings for processor-specific and OEM-specific encodings, each of which may be a separate field within a command header (and in addition to a standard encoding for a transaction of the communication protocol).

TABLE 1

| Field Name | Encoding | Standard Command | Notes |
|---|---|---|---|
| Processor-Specific Encoding | 000: Standard transaction with EA Header and Address[63:51] = 0<br>001: Partial read transaction; length of the request determined by Length[5:0] field<br>010-111: Reserved | NcRdPt1 | 9 flits for standard transaction<br>2 flits for processor-specific opcode = 001 |
| | 000: Standard transaction with EBDW Header and Address[63:51] = 0<br>001: Partial write transaction, Byte mask indicates bytes to be written<br>010 - 111: Reserved | WcWrPt1 | 1 flit completion for processor-specific opcode = 001 |
| | 000: Standard transaction with EIC Header and Address[63:51] = 0<br>001: AMO or <= 8 byte write on 8 byte address aligned boundary<br>010: Prefetch request; Data bytes are don't care<br>011-111: Reserved | NcIOWr | For AMOs with a completion |
| OEM Defined Encoding | Encodings to cover basic logical and arithmetic operations | NcIOWr | 1 flit completion |

Embodiments may thus be used to perform different types of transactions including memory access transactions such as read and write requests, in addition to atomic memory operations and other operations. Such other operations may include processor-specific operations that enable a processor such as an HPC processor to perform transactions not normally supported by a given communication protocol. As examples, such transactions may include accessing short data items from remote nodes, performing operations atomically on data at remote agents or fetching data from remote agents to some storage location nearer to the initiator of the request. In addition, embodiments may further enable OEM-specific transactions to occur. That is, particular encodings, e.g., of the OEM-specific operation code field may enable an OEM to perform specific transactions that are similarly not supported by a given communication protocol.

Figure 4:
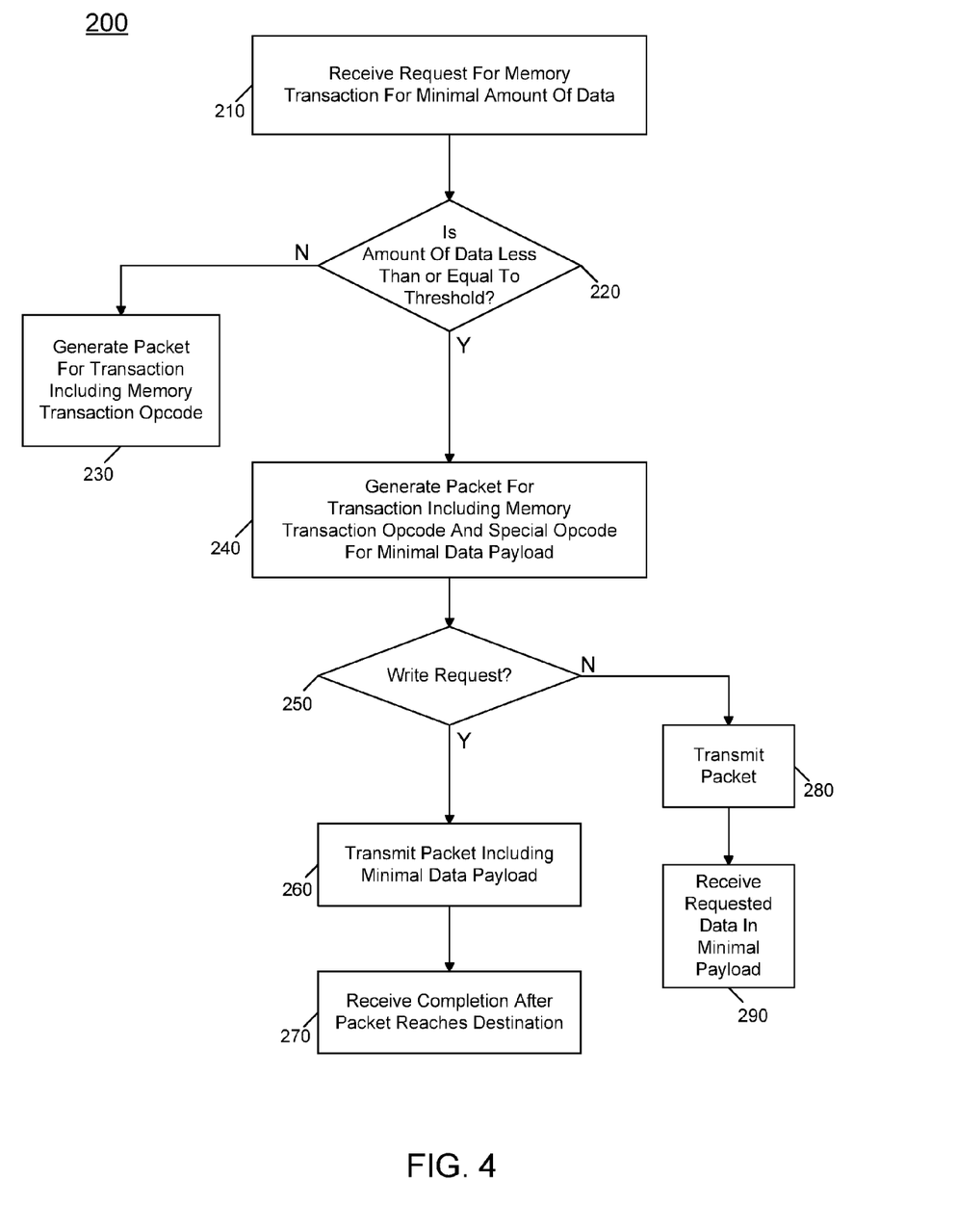
FIG. 4 is a flow diagram of a method for performing a memory access transaction in accordance with one embodiment of the present invention.

Referring now to FIG. 4, shown is a flow diagram of a method for performing a memory access transaction in accordance with one embodiment of the present invention. As shown in FIG. 4, method 200 may be implemented, e.g., by a system agent that communicates with another agent such as a NIC via a link according to a given communication protocol such as a coherent PtP protocol. Method 200 may begin by receiving a request for a memory transaction for a minimal amount of data (block 210). That is, a request, e.g., from a processor core may be to load or store a small amount of data, namely an amount of data smaller than a standard data payload size for the communication protocol.

At diamond 220 it may be determined whether this amount of data is less than or equal to a threshold. Although the scope of the present invention is not limited in this regard, in one embodiment this threshold may be eight bytes. In this way, if the amount of data associated with the transaction is less than or equal to eight bytes, the memory access transaction can occur with a minimal amount of flits (fewer flits than for a conventional transaction of the communication protocol). If it is determined at diamond 220 that the amount is not less than the threshold, control passes to block 230 where a packet may be generated for the transaction including a standard memory transaction opcode. Thus the transaction may be sent and processed in accordance with the standard communication protocol processing flows.

If instead at diamond 220 it is determined that a data amount is less than or equal to the threshold, control passes to block 240. At block 240 a packet may be generated for the transaction that includes both the standard memory transaction opcode as well as a special opcode to indicate the presence of a minimal data payload. Control then passes to diamond 250 where it is determined whether the transaction is for a write request. If so, control passes to block 260 where a packet may be transmitted including a minimal data payload (block 260). For example, assuming that the data portion is less than or equal to eight bytes, the packet for this memory transaction may only be two flits (one flit header and one flit data payload). In contrast, for an example communication protocol a typical write transaction data packet may be nine flits. After the packet has been transmitted and handled appropriately by the destination, the agent may receive a completion packet (block 270).

Still referring to FIG. 4, if instead at diamond 250 it is determined that the request is a read request, control passes to block 280 where the read request may be transmitted. Then when the data has been read from the destination location, the agent may receive the requested data in a minimal payload packet (block 290). With reference to the example above, this packet may be a non-coherent read completion of minimal size (e.g., two flits).

Figure 5:
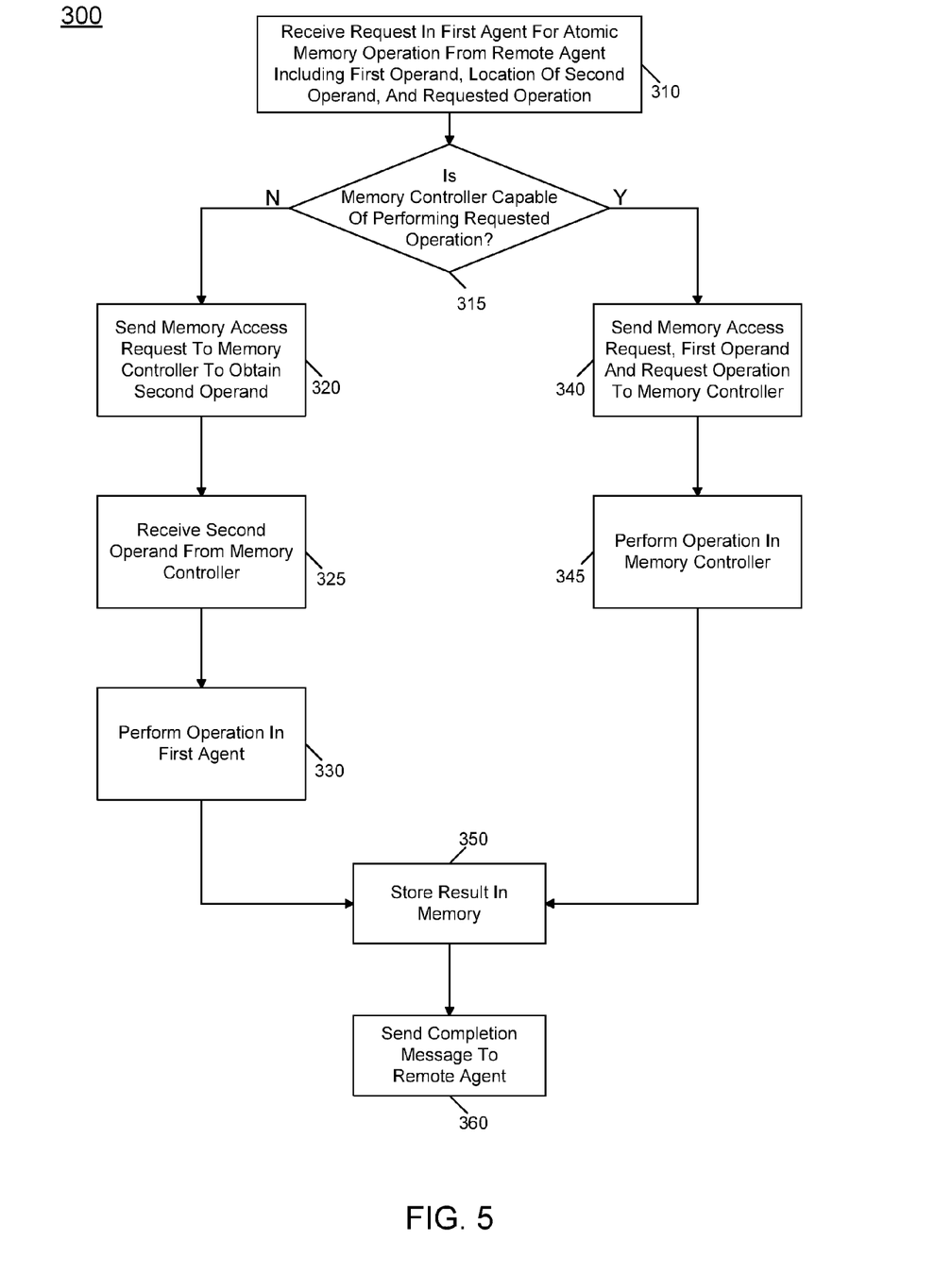
FIG. 5 is a flow diagram of a method in accordance with another embodiment of the present invention.

Other embodiments may be used to perform atomic memory operations in which at least one operand of the operation is also of a limited size, as compared to a standard payload for a given communication protocol. Referring now to FIG. 5, shown is a flow diagram of a method in accordance with another embodiment of the present invention. As shown in FIG. 5, method 300 may begin by receiving a request in a first agent for an atomic memory operation (block 310). As an example, this request may be received at a home agent of a first node from an agent of a remote node. More specifically, the request may be transmitted from the remote node and provided to, e.g., a NIC of the local node which may in turn provide the request to the home agent. In one embodiment, this request may include a first operand, an indication of the location of another operand, and the requested operation such as a given arithmetic operation. Next, it may be determined whether a memory controller is capable of performing the requested operation (diamond 315). That is, in some implementations a memory controller coupled to a local memory of the node may have one or more execution units such as an arithmetic logic unit (ALU) that is capable of performing the requested operation. Note that while FIG. 5 shows this determination, embodiments may instead be configured to either provide the request to the memory controller or handle of the operation within the home agent without making this determination.

If it is determined that the memory controller is not capable of performing the operation, control passes to block 320 where a memory access request may be sent to the memory controller to obtain the second operand. The second operand may then be received from the memory controller (block 325), and accordingly the home agent may perform the requested operation (block 330). Because the request is responsive to an atomic memory operation, note that communications back to the requester agent are not needed, as the operation can be directly performed in the first node.

If instead it is determined that the memory controller has support to handle the operation, control passes from diamond 315 to block 340, where the memory access request, first operand and the requested operation may be sent to the memory controller. Accordingly, the memory controller may obtain the second operand from memory and perform the operation (block 345).

Control passes to block 350 from both of blocks 330 and 345 such that the result of the operation is stored in the memory directly without the need for a communication of any result back to the requester agent. At this time, the operation is complete and a completion message may be sent back to the remote agent (block 360). While shown with this particular implementation in the embodiment of FIG. 5, the scope of the present invention is not limited in this regard.

Figure 6:
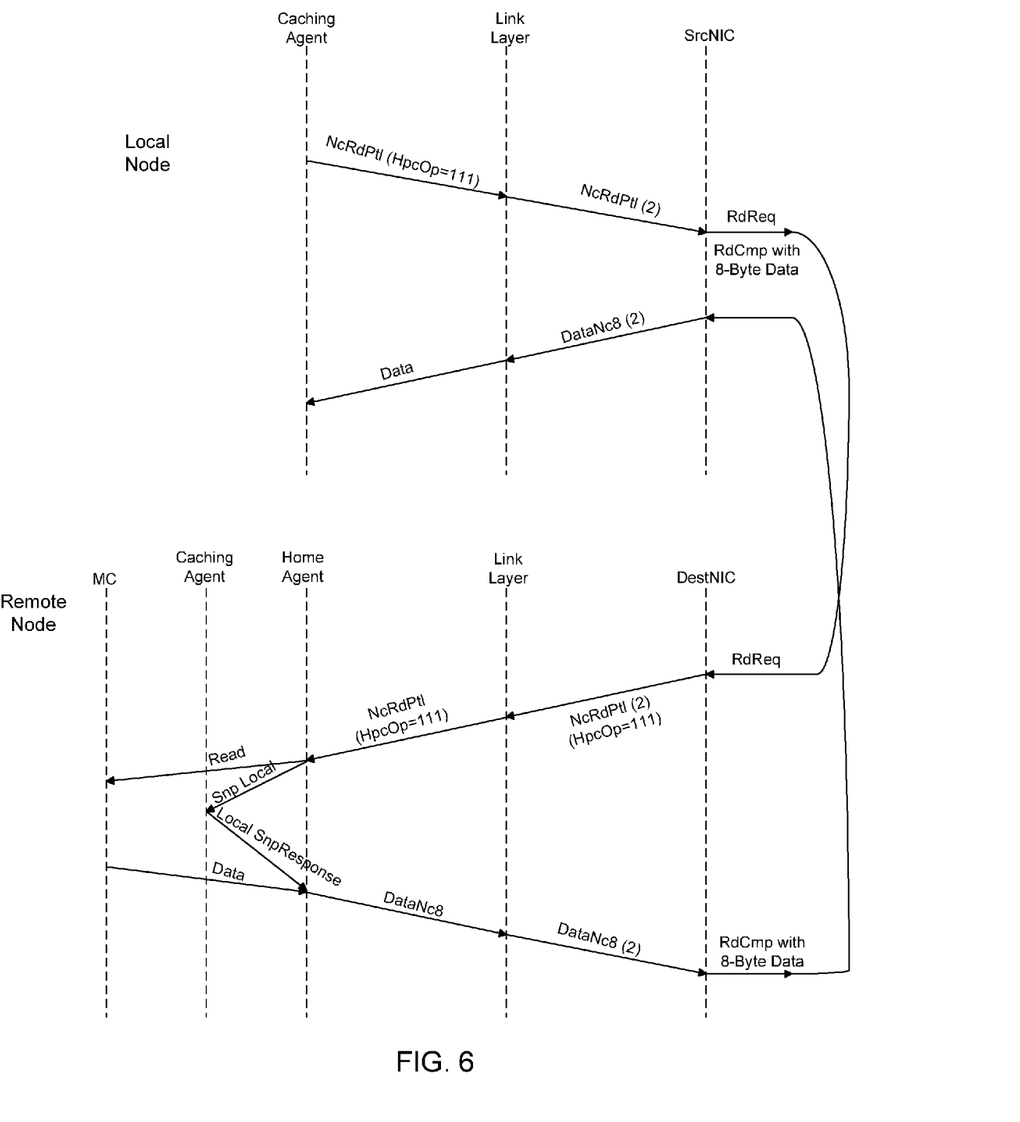
FIG. 6 is a flow diagram for a remote read operation in accordance with one embodiment of the present invention.
Figure 7:
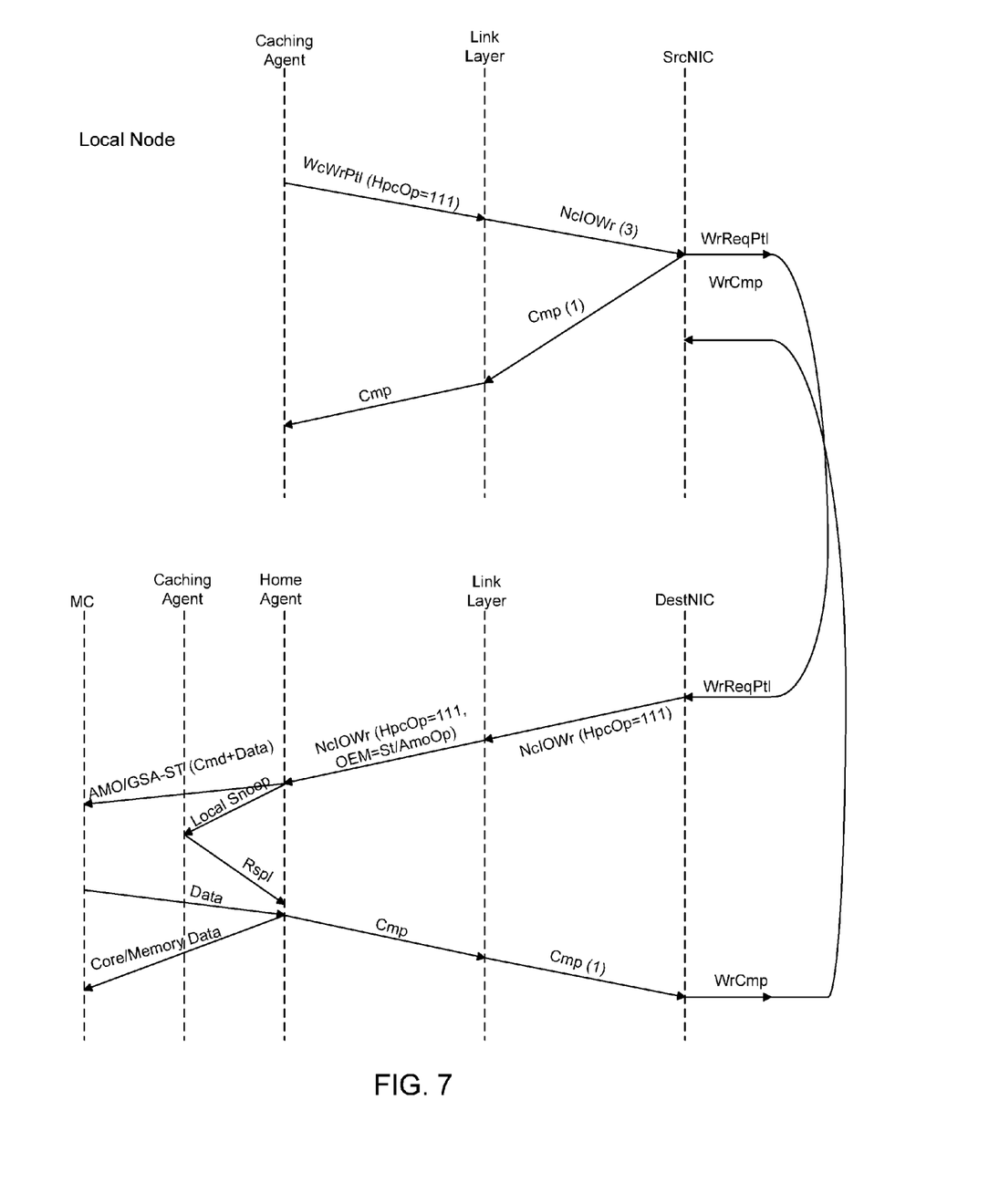
FIG. 7 is a flow diagram for a write operation to a remote agent in accordance with one embodiment of the present invention.
Figure 8:
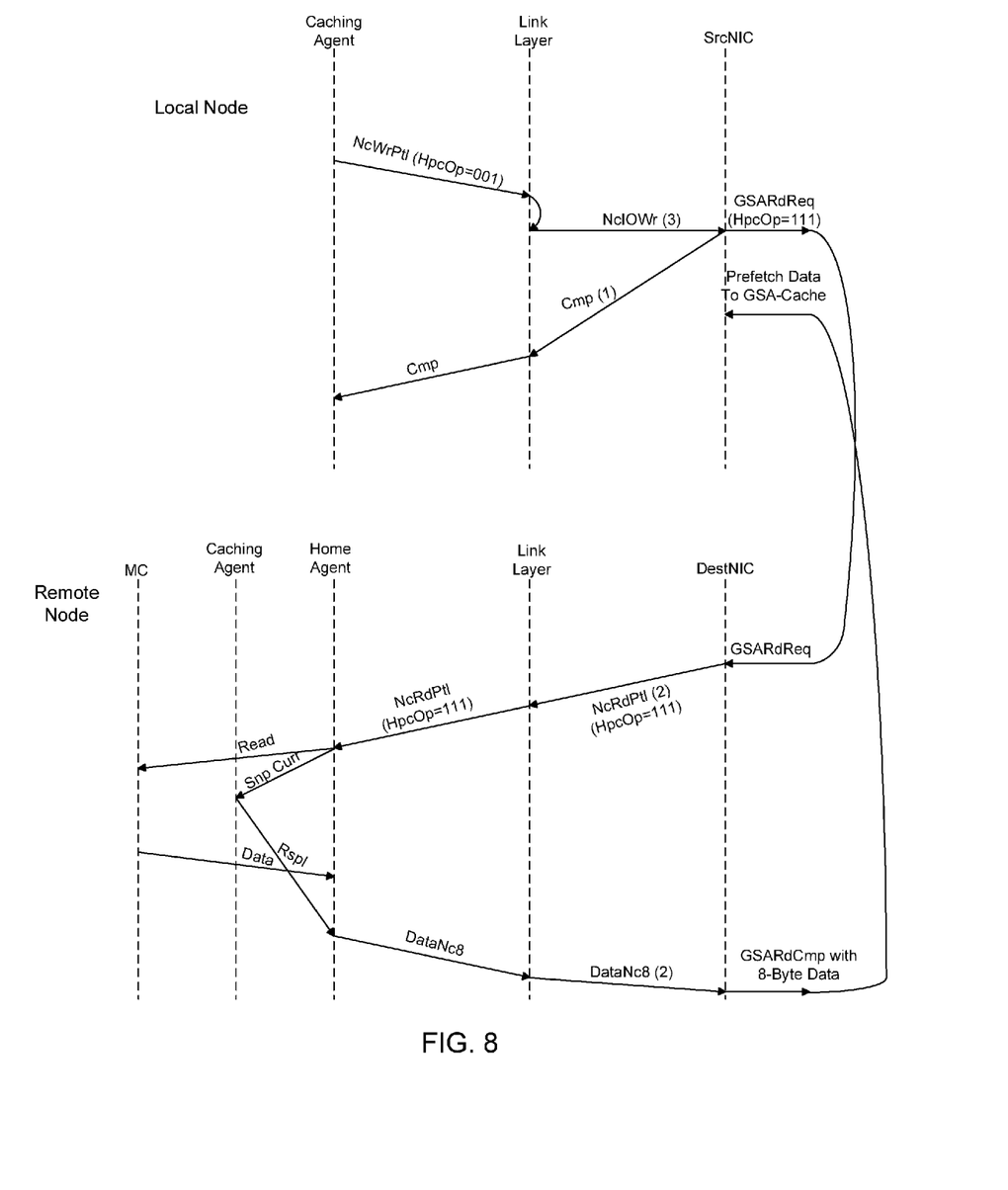
FIG. 8 is a flow diagram for a prefetch operation to a remote node in accordance with one embodiment of the present invention.

FIGS. 6-8 illustrate example flows for handling operations in accordance with different embodiments. FIG. 6 depicts transaction flows for a GSA-load (reading data from a remote node), FIG. 7 depicts transactions for AMO operation at the remote node and FIG. 8 depicts transactions for GSA-prefetch (prefetching data from a remote node). Note that these figures do not include flow details that are not relevant for the described embodiments. As seen, these Feynman diagrams show a set of protocol agents at the local/requesting node and a set at the destination or home memory node. The agents are a caching agent, which is an agent having the ability to cache data, a link agent such as a link layer that can generate link messages, NICs at the source and destination nodes, a home agent (which is an agent that owns a targeted region of memory) and a memory controller.

With reference to FIG. 6, a flow for a remote 8 byte read is shown. As seen, the requesting caching agent forwards the read request to the local NIC (SrcNIC) which in turn forwards the request to the remote NIC (DestNIC). This NIC forwards the request to the home agent. In turn, the home agent performs local snooping (if required) and also performs a memory read. Note in this regard that the home agent thus uses a non-coherent memory access request (NcRdPtl) semantic, avoiding the need for the NIC to perform coherency checks over the link, and takes the responsibility of converting this request into a coherent memory request (owing to the snoop operation). Accordingly, embodiments provide for the ability to perform a coherent operation responsive to a request using non-coherent request semantics.

Still referring to FIG. 6, the data read from memory is then sent back to the requesting caching agent through the same path as the request. Note that by using a special operation code in accordance with an embodiment of the present invention for a limited data size packet, the read request and data return messages can be sent with limited payload packets, thus using only 4 flits for the request path and 4 for the return path, instead of a total of 21 flits according to a standard communication protocol.

With reference to FIG. 7, a flow for an 8 byte write to a remote home agent is shown. This write flow may be by a non-coherent IO write transaction (NcIOWr) semantics of small size (e.g., 3 flits). As further seen, a completion message may be sent back to the caching agent directly from a source NIC and without waiting for a full memory transaction to complete in the memory controller of the remote agent. Again, a reduced number of flits can be used to send a write request with a reduced data payload. Also a similar flow may be used for an atomic memory operation, and thus the indications from the remote home agent to the caching agent and memory controller of the remote node show possible transactions to perform the atomic memory operation.

Referring now to FIG. 8, shown is a flow for an eight byte prefetch to a remote node, where the data requested as mentioned earlier, may be prefetched to a storage location nearer to the requester and not necessarily to the requesting processors caches. As seen, this prefetch at the requesting node may similarly be via non-coherent I/O write request semantics. Again note that a completion may be directly generated by the source NIC upon receipt of the prefetch request, enabling a caching agent to release any resources used by this request early and continue unrelated processing awhile the data return to storage at the near NIC occurs. Due to the special operation code used, note that a return for a smaller data payload is realized, namely a data return message of 8 bytes (a 2 flit message). While shown with these particular flows in the above examples, understand that the scope of the present invention is not limited in this regard to neither the size of the transfer nor to the location of the storage element.

Figure 9:
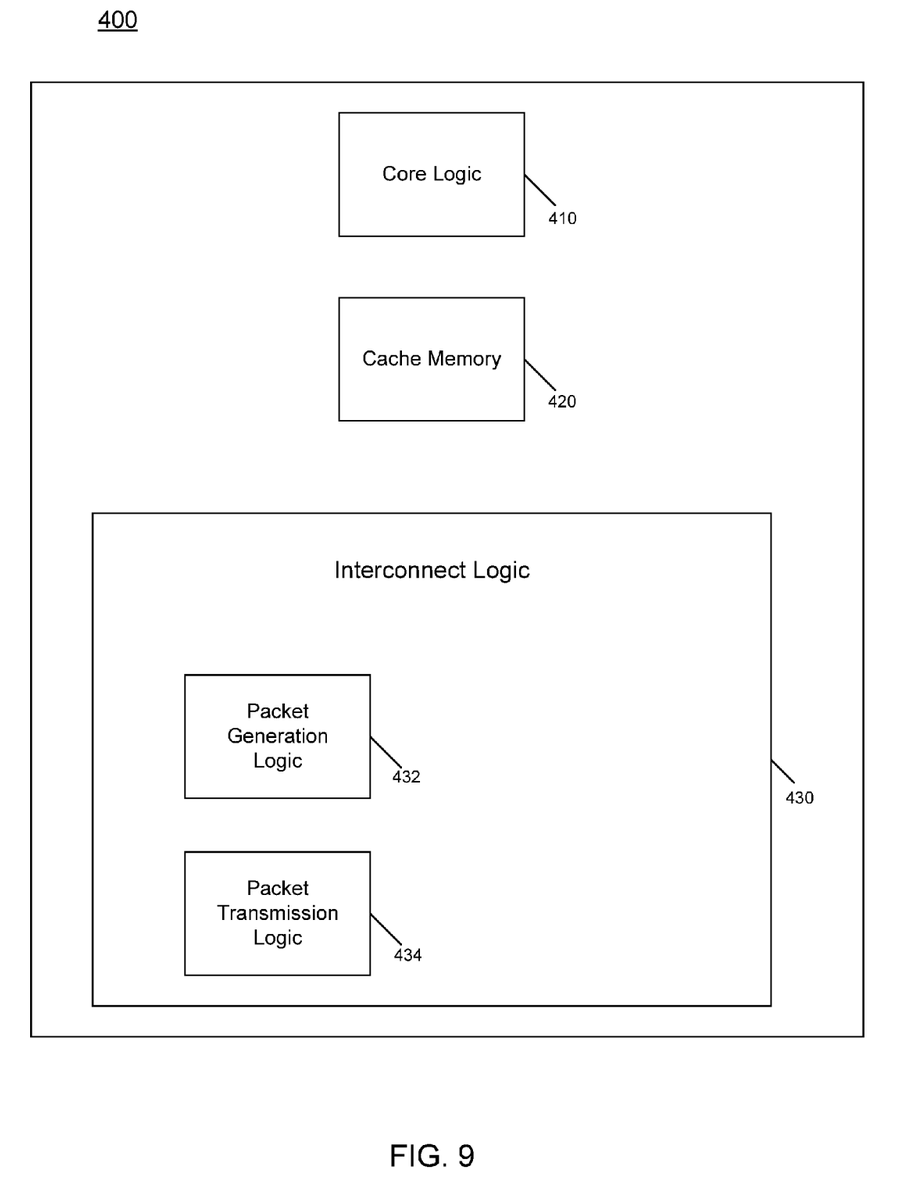
FIG. 9 is a block diagram of a processor in accordance with one embodiment of the present invention.

Referring now to FIG. 9, shown is a block diagram of a processor in accordance with one embodiment of the present invention. As discussed above, implementations may be incorporated into an HPC system including an HPC processor. This processor may include a plurality of cores, generally represented in FIG. 9 as core logic 410. Each such core may be associated with a cache memory 420. For example, each core may be associated with a private cache memory such as a low level cache memory. In turn, the private cache memories may be coupled to a shared cache memory, e.g., as an inclusive cache hierarchy, although the scope of the present invention is not limited in this regard.

As further seen in FIG. 9, processor 400 may further include interconnect logic 430. Such interconnect logic may be logic in accordance with a given communication protocol and may further provide for handling extensions to such protocol, e.g., to transmit data packets having a smaller data payload than the standard for the protocol, or to transmit processor or OEM-specific commands that are unsupported by the communication protocol. As represented in FIG. 9, such logic may include package generation logic 432 which may be link layer logic to receive requests from the cores and to generate packets for transmission on one or more interconnects that couple the processor to other agents. Such logic may enable communication of packets having multiple operation codes for a single data packet, one of which is a standard operation code, e.g., for a memory access transaction, and the second of which is to provide special information for the handling of this transaction, e.g., to indicate a smaller size of the payload portion of the packet or to provide a specific request such as atomic memory operation.

Coupled to package generation logic 432 may be a packet transmission logic 434, which may be physical layer logic to take the generated packet and format it for electrical communication along the interconnect. While not shown for ease of illustration, understand that both packet transmission logic 434 and packet generation logic 432 may have corresponding reception logic and conversion logic to receive incoming packets from the interconnect(s) and process the information to provide it to the one or more cores of the processor. While shown with this high level view in the embodiment of FIG. 9, understand the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
generating a data packet having a command portion including a first opcode to encode a transaction type of the data packet and a second opcode to encode a processor-specific operation to be performed by a destination agent and corresponding to a transaction not supported by a communication protocol, wherein the command portion corresponds to an atomic memory operation; and
transmitting the data packet from a processor on a link coupled to the processor, the link according to the communication protocol, wherein responsive to the atomic memory operation, the destination agent is to send a memory access request to a memory controller coupled to a memory to obtain a second operand, and perform an operation responsive to the second opcode on a first operand and the second operand in one of the destination agent and the memory controller to obtain a result.

2. The method of claim 1, wherein the second operand is of a smaller size than a size of a data portion according to the communication protocol.

3. The method of claim 1, further comprising receiving a completion message from the destination agent after the result is stored in the memory.

4. The method of claim 1, further comprising performing the operation in the memory controller, wherein the memory controller includes a logic unit to perform the operation, and further comprising sending the first operand and the second opcode to the memory controller from the destination agent.

5. The method of claim 1, further comprising generating the data packet having a smaller size than a data packet size for the communication protocol.

6. A processor comprising:
a plurality of cores;
a link layer logic to generate a data packet having a command portion including a first opcode to encode a transaction type of the data packet and a second opcode to encode a processor-specific operation to be performed by a destination agent and corresponding to a transaction not supported by a communication protocol, wherein the second opcode is to cause the destination agent to send a memory access request to a memory controller coupled to a memory to obtain a second operand, perform an operation responsive to the second opcode on a first operand included in a data portion of the data packet and the second operand to obtain a result, and store the result in the memory; and
a transmission logic coupled to the link layer logic to transmit the data packet on a link coupled to the processor, the link according to the communication protocol.

7. The processor of claim 6, wherein the link layer logic is to generate the data packet with a data portion having a size smaller than a size of a data portion according to the communication protocol and to set the second opcode to identify the smaller size data portion.

8. The processor of claim 6, wherein the link layer logic is to transmit the data packet having a number of flow control units, the number of flow control units less than a number of flow control units for a data packet according to the communication protocol.

9. The processor of claim 6, wherein the second opcode is to cause the destination agent to obtain data from a memory and to communicate the data to the processor via a return data packet having a data portion with a size smaller than a size of a data portion according to the communication protocol.

10. The processor of claim 6, wherein the second opcode is to cause the destination agent to write data of a data portion of the data packet into a memory associated with the destination agent, wherein the data portion has a size smaller than a size of a data portion according to the communication protocol.

11. The processor of claim 6, wherein the second opcode is to cause the destination agent to send a completion message to the processor after the result is stored in the memory.

12. The processor of claim 6, wherein the first opcode is to indicate a memory access transaction and the second opcode is to indicate that data of the memory access transaction is of a size less than a size of a data portion according to the communication protocol.

13. The processor of claim 12, wherein the memory access transaction is a non-coherent transaction and the destination agent is to convert the non-coherent transaction to a coherent transaction to perform coherent processing responsive to the coherent transaction.

14. A system comprising:
a first processor including a link logic to generate a data packet having a command portion including a first opcode to encode a transaction type of the data packet and a second opcode to encode a processor-specific operation to be performed by a second processor and corresponding to a transaction not supported by a communication protocol; and the second processor coupled to the first processor to receive the data packet and to perform the processor-specific operation responsive to the first and second opcodes, wherein the second opcode is to cause the second processor to send a memory access request to a memory controller coupled to a memory to obtain a second operand, perform an operation responsive to the second opcode on a first operand included in the data packet and the second operand to obtain a result, and store the result in the memory.

15. The system of claim 14, wherein the link logic is to generate the data packet with a data portion having a size smaller than a size of a data portion according to the communication protocol and to set the second opcode to identify the smaller size data portion.

16. The system of claim 14, wherein the second opcode is to cause the second processor to obtain data from the memory and to communicate the data to the first processor via a return data packet having a data portion with a size smaller than a size of a data portion according to the communication protocol.

* * * * *